United States Patent
Grau

(10) Patent No.: US 9,940,717 B2
(45) Date of Patent: Apr. 10, 2018

(54) METHOD AND SYSTEM OF GEOMETRIC CAMERA SELF-CALIBRATION QUALITY ASSESSMENT

(71) Applicant: Intel Corporation, Santa Clara, CA (US)

(72) Inventor: Oliver Grau, Volklingen (DE)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 14/580,988

(22) Filed: Dec. 23, 2014

(65) Prior Publication Data

US 2016/0180510 A1    Jun. 23, 2016

(51) Int. Cl.
*G06T 7/00* (2017.01)
*G06T 7/80* (2017.01)

(52) U.S. Cl.
CPC ........... *G06T 7/002* (2013.01); *G06T 7/85* (2017.01); *G06T 2207/30168* (2013.01)

(58) Field of Classification Search
None
See application file for complete search history.

(56) References Cited

U.S. PATENT DOCUMENTS

| | | | |
|---|---|---|---|
| 7,742,635 B2 * | 6/2010 | Rohaly | G06T 7/0018 382/106 |
| 2015/0130951 A1 * | 5/2015 | Olson | G06T 7/0018 348/184 |
| 2015/0381964 A1 * | 12/2015 | Drouot | G06T 7/002 348/47 |
| 2015/0381968 A1 * | 12/2015 | Arora | G06T 17/00 348/47 |

OTHER PUBLICATIONS

Triggs, B., et al., "Bundle Adjustment—A Modern Synthesis," Vision Algorithms'99, LNCS 1883, pp. 298-372, 2000.
Hartley, R., et al., "Multiple View Geometry in Computer Vision," Second Edition, Cambridge University Press, 2000, 2003.

* cited by examiner

*Primary Examiner* — Sumati Lefkowitz
*Assistant Examiner* — Jiangeng Sun
(74) *Attorney, Agent, or Firm* — Green, Howard & Mughal, LLP

(57) ABSTRACT

Techniques related to geometric camera self-calibration quality assessment.

25 Claims, 8 Drawing Sheets

METHOD AND SYSTEM OF GEOMETRIC CAMERA SELF-CALIBRATION QUALITY ASSESSMENT

BACKGROUND

Geometric camera calibration is provided to set or adjust camera parameters to accurately map real 3D points in a scene into 2D image coordinates of the camera. The mapping may be used to create a measurable virtual 3D space with the objects in the scene. This calibration is important to provide accurate 3D mapping for a variety of computer vision applications such as 3D scanning or measuring the size of objects from an image, depth estimation for artificial intelligence (AI) vision systems, and so forth.

Whether by calibrating a golden (or ideal) device or specific camera products, carefully controlled factory calibration may be performed where the 3D points of an object, such as a checker board, are placed in front of one or more cameras at measured distances from the camera(s) to capture the image of the object. The computed 3D points are determined from the image data and then compared to the actual 3D points of the object. Any differences in 3D position for the same points are then compensated for by adjusting the parameters of the camera.

Due to manufacturing tolerances, however, a single device may have distortions or variances (from the ideal) in zoom, focal length, optical axis position (e.g., center point shift) or rotational shift that are not adequately compensated by the factory calibration. This is particularly true with devices that have multiple on-board cameras such as tablets. In some cases, the user is limited to sending the device back to the manufacturer for recalibration when the camera 3D mapping is insufficient. In some other cases, on-board self-calibration is provided and includes having a user activate the camera to capture images, and then 3D points projected from the 2D points on the images as well as new parameter settings for the camera are calculated from real 3D points of objects in the scene being photographed or recorded. The self-calibration typically uses an image of a natural scene (rather than requiring the user to set an object of known dimensions in the image). This self-calibration, however, can be inaccurate depending on the content of the image.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures.

DETAILED DESCRIPTION

Figure 1:
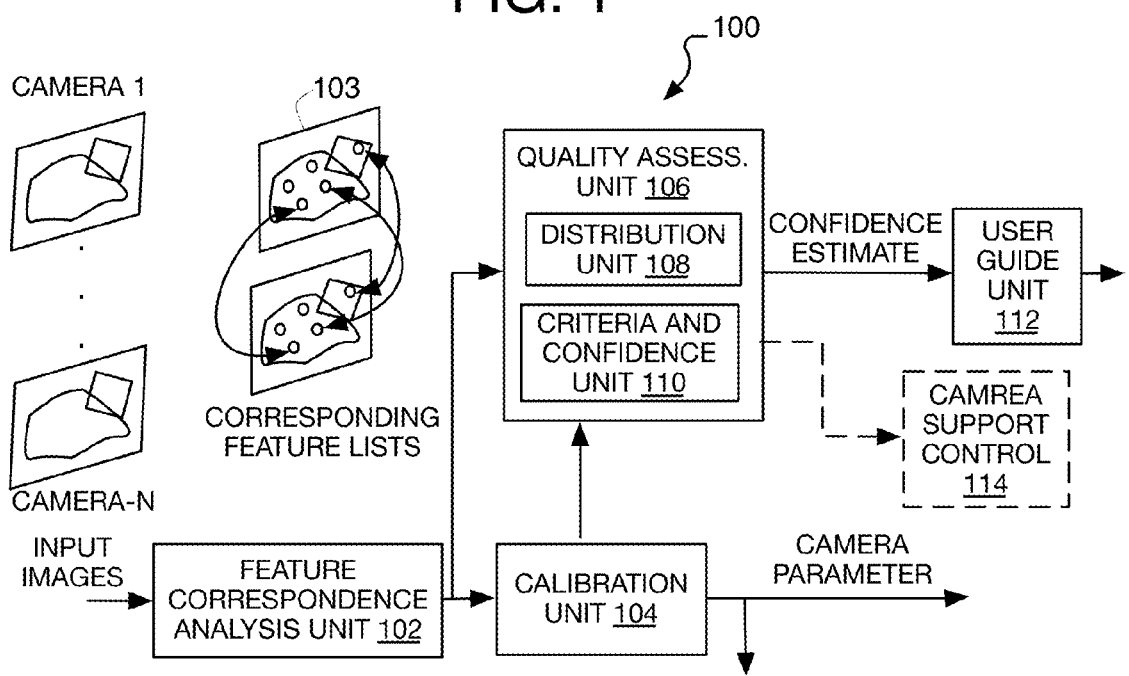
FIG. 1 is an illustrative diagram of an image processing device with a calibration quality assessment unit.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, tablets with multiple cameras, webcams, video cameras, video game panels or consoles, set top boxes, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide geometric camera self-calibration quality assessment.

As mentioned above, geometric camera calibration is provided to set or adjust camera parameters to accurately map real 3D points in a scene into 2D projections (or 2D image coordinates) that can be observed on an image of the camera. The mapping may be used to create a measurable 3D space with the objects in the scene. This calibration is important to provide accurate 3D mapping of a 3D space for a variety of computer vision applications such as 3D scanning or measuring the size of objects from an image, depth estimation for artificial intelligence (AI) vision systems, and so forth.

Conventional camera calibration is often performed in a controlled environment, such as at the camera manufacturer, with calibration target objects with known 3D geometry, like checkerboards, where the known 3D points on the object are referred to as markers. The target object is placed in front of the camera in a known orientation at a known distance from the camera. Such marker-based calibration may use the calibration target to determine the camera parameters from a number of images taken of the target. For example, the OpenCV computer vision library contains a set of functions to determine 2D coordinates of a checkerboard calibration chart and to calibrate a single camera from that information. A calibration chart is a 3D mapping of the 3D markers on the target object to 2D image points. It is also possible to have 3D arrangements of calibration objects.

Due to manufacturing tolerances, however, a single device may have distortions or variances (from the ideal) in zoom, focal length, optical axis position (e.g., center point shift) or rotational shift that are not adequately compensated by the factory calibration. This is particularly true with devices that have multiple on-board cameras such as tablets. In some cases, the user is limited to sending the device back to the manufacturer for recalibration when the camera 3D mapping is insufficient.

To attempt to resolve these issues, conventional on-board, self-calibration exists on individual devices that may be performed by a user. Typically, known self-calibration computer vision techniques, also provided by OpenCV, uses a structure-from-motion type of analysis of multiple images. This includes calibration by bundle adjustment (BA). Bundle adjustment is a method that determines camera parameters and optionally estimates the position of 3D points from corresponding 2D data from a series of 2D images. The correspondences either can be determined by markers (like calibration charts) or from analysis of image features, or in other words, the objects in the content of a captured image even when those objects have not been measured, which may be referred to herein as natural scene features or objects.

The calibration, however, determines parameter error and 3D point accuracy only in the boundaries set by the (mathematical 3D) space represented by the calibration data. Specifically, since the calibration is based on real 3D scene points and its projected 2D observation points, the parameters determined by the calibration are by nature only valid from 3D points that are in the calibration volume. The outer extents of the farthest observation points may define the size of the volume. By one form, the parameter error is calculated by using a mean of the differences (or residuals) between the 3D observation point coordinates and a minimized parameter, explained in detail below. Thus, the calibration is highly dependent on the distribution of the observation points (both the number of points and location of points) within the calibration volume. For example, a calibration with only one image of a chart (e.g., a picture of a chart) at 1 m in front of a camera will not generate accurate results for short or long distances because the calibration volume was limited to an interval around a few centimeters where the interval is located about 1 meter from the camera.

To overcome these disadvantages, a method and system is provided to assess the quality of a calibration by determining the distribution of the observation points being used for the calibration and assessing the quality (or sufficiency) of the distribution, thereby providing the opportunity to target a more useful distribution for a more accurate calibration if the current distribution of observation points is insufficient. Specifically, the method includes the use of natural image features to perform the camera self-calibration. Once 3D observation points are identified and refined by a first self-calibration, the system automatically estimates the quality of the self-calibration.

The disclosed method and system described herein allows for prediction of the quality of the calibration of single or multi-camera systems. With this arrangement, the quality assessment process can be used in a manufacturing environment. Moreover, it can be used to allow end users without special equipment to calibrate a device without the need to re-send it to the factory. The resulting quality can be communicated to a user in order to guide un-trained end users to re-calibrate their device with a better distribution of observation points. This may include using a user interface to indicate what additional or different information needs to be captured to improve the quality of the calibration, as well as suggestions on a user interface to instruct the end users as to how to capture a better distribution of observation points to calibrate the device. Such suggestions and instructions may include ways to move the device or change settings on the device to include a distribution of sampled observation points that is spread out more effectively within a three-dimensional calibration volume.

Referring to FIG. 1, an image processing system or device 100 may be provided to process captured images and perform the geometric self-calibration quality assessment methods disclosed herein. Thus, the image processing device 100 may be a stand-alone device, such as a digital camera. Otherwise, the image processing device 100 may be a multi-function electronic device with one or more mobile cameras (or camera modules) that has the ability to capture images such as a smartphone, mobile phone, tablet, laptop, and so forth. The image processing device 100 may be a single camera or may be a network of cameras, or may be a processing device such as a computer or server that is separate from any cameras or that communicates with one or more cameras.

In the present example, the image processing system 100 may generate, or may receive, the image data of one or more input images labeled camera-1 to camera-N. This may include multiple images of the same general scene (with the same objects in the scene) except shot from different angles with the current image processing device 100 when it is a camera, or from another image capture device, or the images may be received from other multiple image capture devices, or some combination of these, to form a set of images. The set of images may be a set of still photographs or frames of a video sequence. The image data may include a grid of pixel locations and the luminance and chroma values for each of the locations. While the image data used for geometric calibration could be raw image data, in the present examples, the image data is at least partially pre-processed which may include black-level correction, lens shading correction, down or up-scaling (or sampling) to control computation loads, 3A related corrections involving autofocus (AF) computations or statistics, automatic white balance (AWB), and/or automatic exposure corrections (AEC) that may change the luminance or color values of the image data, noise reduction, pixel linearization, resolution reduction, Bayer demosaic, and/or vignette elimination as well as other tasks. The image data may be received in real-time for providing guidance to users as explained below, or in non-real time from a memory unit.

The preprocessed image(s) may be received by a feature correspondence analysis unit 102. This unit may detect 2D points (or 2D keypoints) of objects within the images, and determine the correspondence of objects from image to image in the set of images. Then, the feature correspondence analysis unit 102 may use triangulation or other methods mentioned below to establish first (or preliminary) 3D observation points with coordinates within a 3D virtual space that corresponds to the set of images.

The calibration unit 104 then uses the preliminary 3D observation points to revise the locations of the 3D observation points. Calibration herein refers to the set of computations used to determine camera parameter settings as well as to correct the input preliminary 3D observation points to the calibration unit. Such calibration unit may use bundle adjustment (BA) computations similar to that provided by OpenCV. The specific operation of the calibration unit is provided below.

The revised (or adjusted) 3D observation point locations after the calibration by the calibration unit 104 as well as image-to-image object correspondence data from the feature correspondence unit 102 is provided to the quality assessment unit 106. The quality assessment unit 106 has a distribution unit 108 that generates distributions of the 3D observation points in a 2D pattern and a virtual 3D space (also referred to herein as a calibration space, 3D volume, or calibration volume) associated with the set of images, divides the 2D pattern and 3D space into sections, and then uses the correspondence and revised 3D observation point data to determine the location of the revised 3D observation points within each of the sections. A criteria and confidence unit 110 then determines the sufficiency of the distribution, and by one example, by comparing a count, quality value, and/or confidence estimate of the distribution to a predetermined criteria. By one example, the criteria may depend, at least partially, on whether the distribution has a minimum number of 3D observation points and/or whether certain sections, or all sections of the 2D pattern and/or 3D space have at least one 3D observation point. The details are explained below.

When the distribution is found to be adequate, the current revised 3D observation points are considered to be final and may be used for other applications such as computer vision or artificial intelligence applications and so forth. When the distribution is found to be inadequate, the process loops to prompt a user to obtain a new set of images to improve the distribution of 3D observation points. By one example, a user guide unit 112 is activated and indicates, to a user of a camera of the device 100 for example, that the camera(s) should be moved, and a new set of images should be captured. As explained in detail below, and by one example, a text message may display on one of the devices providing guidance to a user to move the device(s) (whether forward, back, or side to side (or other scene)) to capture the new image set. Also, by one example, at least one of the devices used to capture the image set may display the pattern of sections used to assess the distribution. The sections that have an inadequate amount of 3D observation points may change, such as by color or luminance, or an icon or other visual graphic may display on the inadequate section. The user can then observe when the distribution is adequate by watching the displayed pattern. These and other examples are explained below. The device or camera then may be moved by the user and used to capture new images with a more sufficient distribution of 3D observation points.

Optionally, instead of generating guides, a signal may be sent to a camera support control 114 that automatically moves the camera(s) to new desired positions for calibration, especially in a manufacturing environment. In such a case, the camera(s) may be held by robotic arm or other known support structures for automatically moving one or more cameras.

Figure 2:
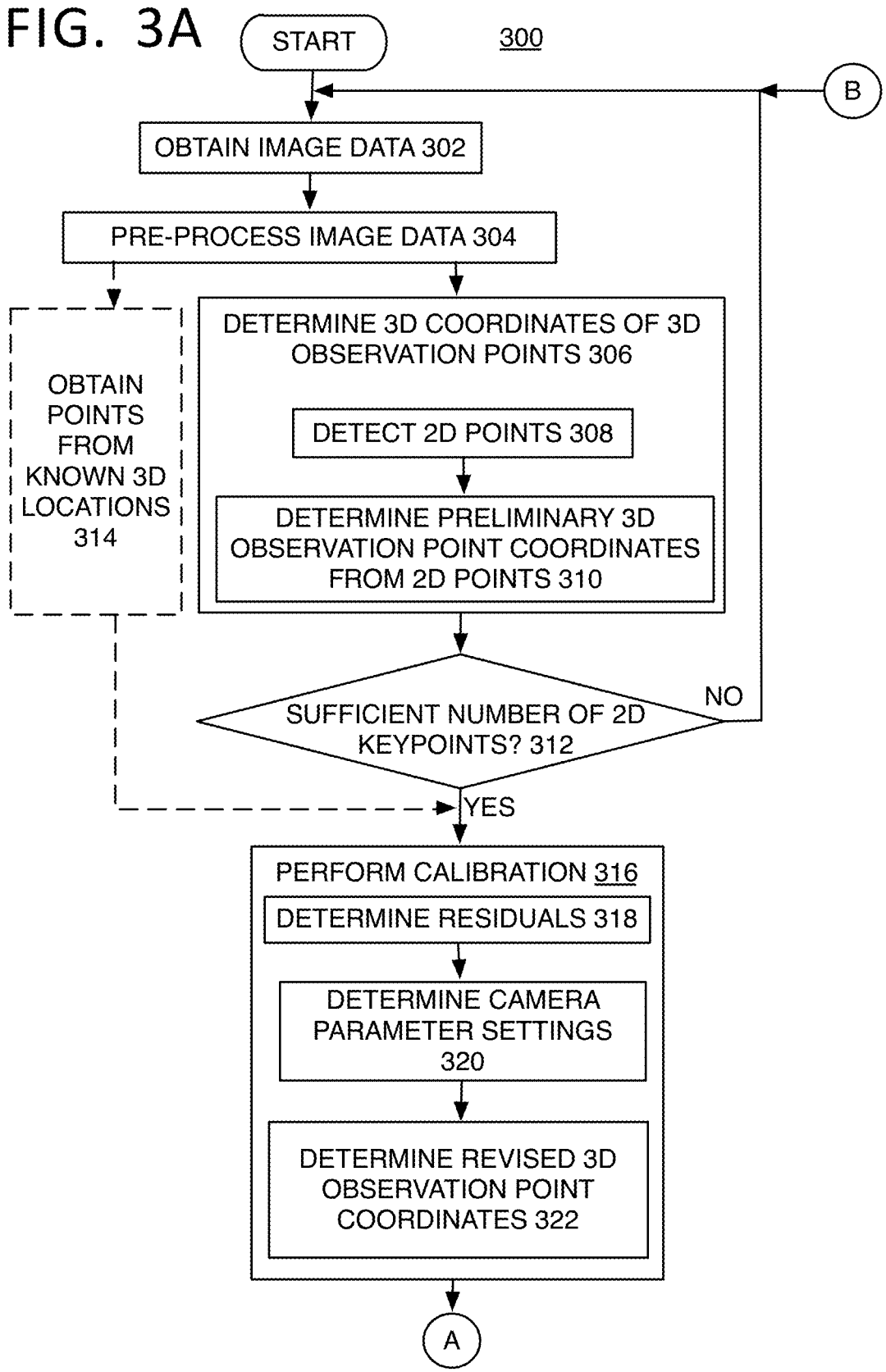
FIG. 2 is a flow chart showing a camera self-calibration method.

Referring now to FIG. 2, by one approach, an example process 200 is a computer-implemented method of geometric camera self-calibration quality assessment. In the illustrated implementation, process 200 may include one or more operations, functions or actions as illustrated by one or more of operations 202 to 204 numbered evenly. By way of non-limiting example, process 200 may be described herein with reference to example image capture devices 100 and 800 of FIGS. 1 and 8 respectively, and where relevant.

Process 200 may include "obtain image data comprising 3D observation point locations associated with at least one image and indicating the location of at least one object in the content of the at least one image" 202. By one example explained herein, the 3D observation points may have already been formed preliminarily by triangulation, and then calibrated to more accurately revise the coordinates of the 3D observation points by bundle adjustment or other calibration methods, so that 3D observation points are now ready for quality assessment.

Process 200 may include "determine whether the 3D observation point locations have a sufficient distribution within a space associated with the at least one image by determining whether the distribution meets a criteria" 204. Particularly, a virtual 3D space is formed for the image set being analyzed, and represented by showing a 2D pattern on one of the images, and a 3D space extending from, or within, the image, where the objects in the image are understood to occupy locations within the 3D space according to the 3D observation points. The 2D pattern or the 3D space or both is divided into sections. The sufficiency of the distribution is based on which sections have the 3D observation points and may be determined by computing a quality value, confidence estimate value, or other counting method. By one example, each defined section should have at least one 3D observation point for the distribution to be adequate. Many other alternatives are provided below. When it is found that the distribution is inadequate, the process may indicate to a user that the camera(s) should be moved to capture a new set of images. This guidance from the camera informs the user which way to move the camera (from side to side (or other scene), or forward, or back relative to the objects in the image).

Figure 3:
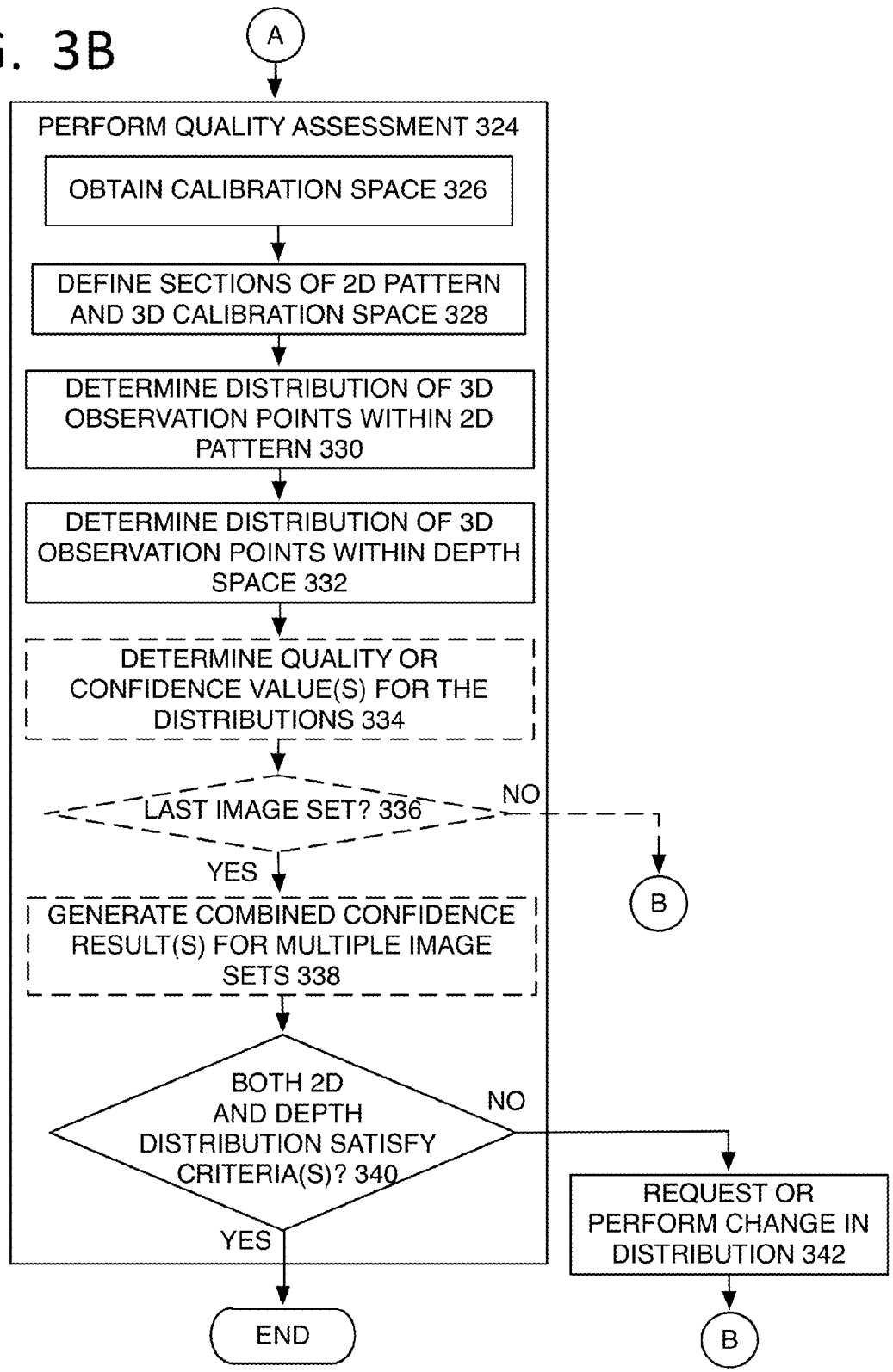
FIGS. 3A-3B is another flow chart of a camera self-calibration method.

Referring now to FIGS. 3A-3B, in more detail, a geometric self-calibration process 300 with quality assessment (or confidence measure) herein is arranged in accordance with at least some implementations of the present disclosure. In the illustrated implementation, process 300 may include one or more operations, functions or actions as illustrated by one or more of operations 302 to 342 numbered evenly. By way of non-limiting example, process 300 will be described herein with reference to example image processing devices 100 and 800 of FIGS. 1 and 8 respectively where relevant.

Process 300 may include "obtain image data" 302, and particularly, obtain data of a set of images with content that includes one or more objects referred to herein as a scene which is not necessarily limited to any types of objects. Thus, the scene may include a landscape type of picture or may be a single object with a uniform background or anything else. A natural scene refers to an image of objects with unknown dimensions or unknown 3D observation points that were not staged solely for calibrating the camera. Thus, a natural image still may include staged or posed objects except with unknown dimensions and distances to the camera for calibration purposes.

Figure 4:
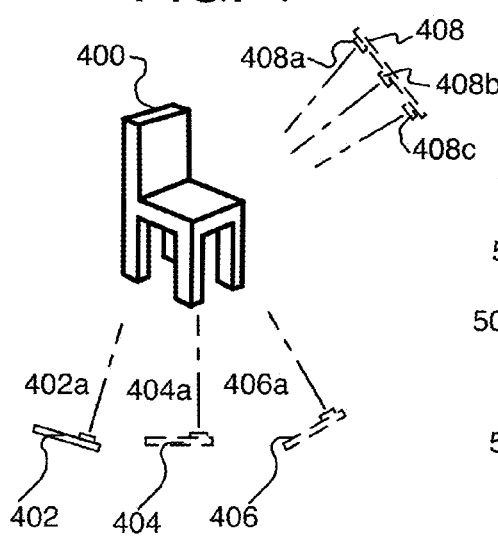
FIG. 4 is an illustrative diagram showing single and multiple camera configurations to capture images of a scene.

The scene or image may be captured as individual photographs or as frames of a video sequence. As shown in FIG. 4 for example, a single image capture device 402 may have a camera 402a to capture a scene 400 with one or more objects, and then may be moved to different positions 404 and 406 relative to the object(s) in the scene. This may be performed to capture separate images at each position or by maintaining video recording in an activated state as the camera is being moved from position to position, which captures motion of the objects in the scene relative to the camera and from frame to frame. As one alternative, the three positions may represent three different cameras. In this case, image capture devices 402, 404, and 406 may exist with a camera 402a, 404a, and 406a respectively. In this alternative case, each camera may take a single picture or image of the scene at different angles so that the multiple images, captured at the same time or otherwise, form a set of images for 3D calibration. A modification of this alternative is to have each camera take multiple separate images or images in running video sequences for each camera so that multiple sets of images are formed and that show the motion or different positions of the objects in the images. In this case, each of the image sets may be a snapshot in time across the multiple video sequences to show the scene at different angles at each moment (or image set). Otherwise, each image set could be a separate video sequence from a single camera of the multiple cameras when the scene is moving, or when the scene is not moving but the slight variations in camera parameters from image to image in the video sequence has significant differences that could be the basis for the calibration.

As yet another alternative, a single device 408 may have multiple cameras 408a to 408c for example, and that may capture the scene as multiple individual images or frames in running video sequences as mentioned for the other alternatives to form multiple image sets for 3D calibration Important here is that each set of images shows the objects in the image moving or in different positions relative to the camera(s) and from image to image in the set whether this is from a single or multiple cameras capturing images from different angles or from a video sequence showing changes in object positions over time. Thus, correspondence can also be established for a scene over time (referred to herein as structure-from-motion). In this case, keypoints are tracked from one position, the device moves, another image is taken, keypoints are then matched (or tracked). This information can be used by the BA to add more constraints and improve camera-parameters. The device movement is described by one combined translation+rotation per new frame (i.e. new position).

When a single image processing device is used, it will be understood that that single device may have the capability to perform the 3D calibration on-board consistent with the description of such devices herein or else known. Otherwise, the image data may be transmitted or communicated over a wireless or hardwire network to one or more other processing devices that have such capability. Likewise, when multiple image capture devices are used, the images may be transmitted or communicated over a network or in other ways, such as by downloading on memory cards, to one of the devices for 3D calibration processing, or may be provided to a separate device for such processing again whether over a wireless or wired network or transported via memory device downloading.

Process 300 may include "pre-process image data" 304, and as explained above, the image data may be processed using known techniques to revise the luminance and chroma values or other parameters of the pixel data to improve the quality of the images, or processing or compression rates associated with the images.

Process 300 may include "determine 3D coordinates of 3D observation points" 306. This may include "detect 2D points" 308, and particularly, detect 2D points that indicate the position of an object or objects in an image. This operation refers to finding potential 3D observation points from 2D points such as the edges or corners of an object in the image, and confirming the 2D points are accurate by determining the correspondence of the 2D points from image to image in a set of images captured as explained above. The 2D points may initially be found by seeking sharp changes in luminance and color for example, and tracking those changes from image to image. Processes to determine corresponding 2D points include stereo analysis, 2D-tracking, or feature matching to name a few examples, and including KLT-tracker. The feature matching is used by OpenCV computer vision techniques. Feature detection and matching extracts keypoints in each image as a first step. Examples of feature detection algorithms include Harris corner detector or FAST detector. In a second step, a feature descriptor is computed for each keypoint. Thirdly, correspondence is established by computing a match between feature descriptors of different images.

Figure 5:
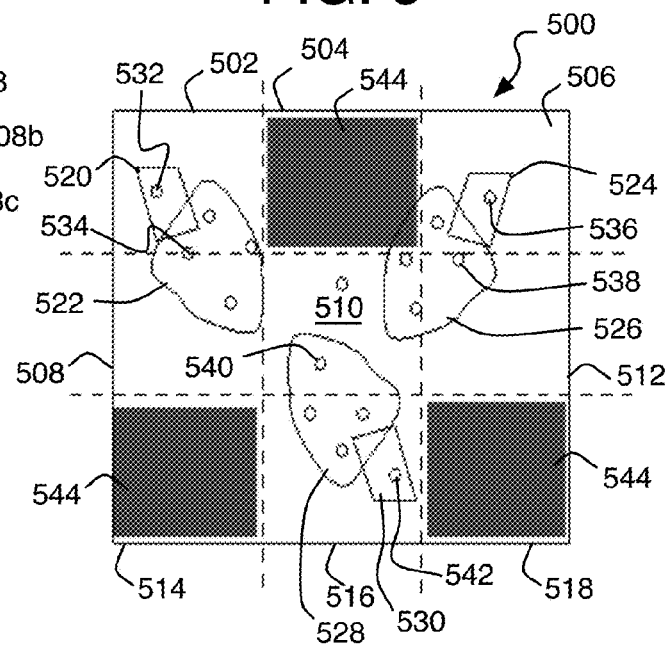
FIG. 5 is an illustrative diagram of a 2D distribution pattern overlain on an image.

Specifically, feature detectors (such as Harris or FAST) find 2d keypoints based on local image characteristics, like an object edge or curvature. The response to that local image feature provides a score of the feature or keypoint and can be used to rank the features and order them in a list with "Nall" entries. To minimize the processing load as much as possible, it is common to limit the number of extracted keypoints to a maximum "Nfeat". This maximum will be chosen to be close to the required minimum number of keypoints (here to obtain a good quality calibration). The common approach is to select the best scoring Nfeat keypoints from the ordered list of keypoints. This might lead to a non-even 2D distribution of the features, as in natural scenes where there are often areas with high-contrast, e.g., with plants or foliage, that provide areas with the highest contrast in the image and high concentration of keypoints. Alternatively, the present closed process may use a 2D histogram to force a better distribution. A histogram with N×M bins, e.g., 3×3 is computed in the illustrated example (FIG. 5). Then Nfeat keypoints are selected, taking into account that the distribution of keypoints is as good as possible. One way to achieve this would be to select those keypoints from bins that have less than Nfeat/(N×M) features, and the best scoring features from the bins with more keypoints.

As yet another alternative, motion vectors as determined by block matching during inter-prediction of encoding can also be used to determine correspondences.

Then, the process 300 may "determine preliminary 3D observation point coordinates from 2D points" 310. Thus, once the corresponding 2D points are determined, this operation may use triangulation to generate preliminary 3D observation points. One method to initialize 3D points for the BA is to re-project 2D points into 3D along the line-of-sight of that 2D point by a fixed estimated distance.

A test is performed either before or after triangulation to determine whether a "sufficient number of 2D keypoints" 312 exist. This may include determining whether there is a minimum number of keypoints at least equal to the number of sections (2D sections×depth sections explained below) defined for a 3D space used to assess the 3D observation point distribution. This number of keypoints is an empirical value. However, the theoretical minimum of keypoint is n=0.5*(number of parameters), where the number of parameters includes all camera parameters+3-coordinates/N-of-cameras.

Alternatively, or additionally, process 300 may include "obtain points from known 3D locations" 314. Thus, by one alternative, scenes with objects of known dimensions at known configurations and known distances to the camera(s), and in turn known marker locations (such as by calibration charts), may be used to obtain the initial 3D observation point locations instead. This may be performed for some key observation points, or a random portion of the observation points, or all of the 3D observation points instead of performing 2D point detection and triangulation for example.

The next operation in process 300 is "perform calibration" 316. By one approach, the actual calibration is computed using bundle adjustment on a set of images. This method determines camera parameters and optionally estimates, or revises, the position of the preliminary 3D observation points from the corresponding 2D data. Thus, process 300 may include "determine residuals" 318. Specifically, one camera calibration technique includes determining equation or minimization parameters by a minimization process that varies the parameters to provide a best match between the observed 2D points and the projected 3D observation points. Generally, since BA is formulated as a least square minimizer, matching the 3D points is performed under a variation of the camera parameters to the observations, and that are the 2d coordinates of the keypoints. Parameters to estimate in this process are the 3D points and the camera parameters. As with all numerical minimization processes, the start is sufficiently close to the solution—hence the initialization. The implemented BA is flexible in the way in which camera parameters are estimated. A camera k is described by a number of m parameters $p_k \in \mathbb{R}^m$. The 3D-2D projection is defined by these $p_k$ parameters:

$$X = (X, Y, Z)^T \stackrel{p_k}{\mapsto} x = (x, y)^T \quad (1)$$

Equation 1 uses the camera projection over a subset of $p_k$ camera parameters with m variable parameters, i.e. the parameters to solve for, where (X, Y, Z) are the revised 3D observation point locations in 3D space, and (x, y) is the resulting, or revised, projected 2D point on the image data to be used for applications. The camera observes scene or marker points $M_i$ that are located in the camera image(s) at point $o_i$ obtained from the preliminary 3D observation points computed by triangulation. The scene or marker points can be projected into the image using the camera projection model of eq. 1 that provides two equations per observed point:

$$o_{i_x} - m_{i_x} = 0 \quad (2)$$

$$o_{i_y} - m_{i_y} = 0 \quad (3)$$

In total, M equations (two times number of observation points) are stored in a residual error vector e:

$$e = o - m \quad (4)$$

The parameters to solve for in the bundle adjustment problem can be estimated by a least squares minimization of the projective error:

$$e = \Sigma(o - m)^2 \quad (5)$$

The error $e_{res}$ is the residual error after the minimization process. Practically, the residual error will be >0 since the camera model is only an approximation and because errors exist in the measured parameters, including the observation point coordinates.

The minimization of the error can be achieved through bundle-adjustment. Bundle adjustment (BA) is a technique originally developed in photogrammetry to solve for 3D geometrical problems such as camera calibration and structure from-motion and has been widely adopted for computer vision applications (Triggs, et al., 2000; Hartley and Zisserman). Mathematically the problem is formulated as a minimization of a number of scene parameters to fit into observations of these in one or more images. For example, the 3D positions of selected scene points (or markers) are estimated usually together with the parameters of one or several cameras seeing these points from 2D images of the scene. The back-projected 2D points are called 'bundles' and gave the name to the method. Parameters to estimate can be any (sub-)set of the camera parameters. The more parameters are estimated, the higher the chance that the resulting calibration is inaccurate. In practice, it is advisable that only those camera parameters are calibrated that are unknown. For factory calibration, this includes all required parameters such as, position+orientation, focal length, center point, radial distortions and other distortions as require, e.g. tangential distortions. For re-calibration, only those parameters that are likely to change need to be estimated. For example, center point and (relative) rotations. Other parameters might be unchanged and would not need recalibration.

Thereafter, process 300 may include "determine camera parameter settings" 320, and particularly the use of the residual errors in algorithms to set the camera parameter values. The particular types of a parameters are as mentioned above.

Also, the calibration operation 316 may include "determine revised 3D observation point coordinates" 322, also by using the computed minimization parameter m values and the residual error values. Thus, the result of the calibration operation 316 is the revised 3D observation point locations (also referred to as the 3D geometry of the key points) to form a 3D space from the set of images being analyzed, as well as the new camera parameter settings for the camera.

Process 300 may include "perform quality assessment" 324. As mentioned, in 3D reconstruction or 3D measurements, high accuracy of the calibration is required, and the accuracy depends on the quality of the calibration. At the time of the calibration, the residual error as computed above and defined by eq. 1 provides some quantitative measure of this quality. However, the residual error only quantifies the quality of the camera parameter fitting to the observation points. The estimation of these camera parameters will be more or less erroneous due to the distortions in camera parameters from certain camera components, and because the calibration merely provides a prediction of the accuracy of the observation point locations within the boundaries set by the (mathematical) 3D space (or calibration volume) represented by the calibration data. Since the calibration is in mathematical terms a statistical mean square minimization, the distribution of the 3D observation points and 2D projections also matters. Thus, if the 3d observation point distribution in the 3D space is inadequate for a target image, the residual errors will be inaccurate. The 3D observation point sampling in both the number of points and location of the points within the 3D space associated with an image set is the overall distribution of the 3D observation points within the 3D space.

So preliminarily, the process 300 may include "obtain calibration volume" 326. By one form, the calibration volume is set by using the farthest span of 3D observation points as the outer dimensions of the calibration volume in all three directions (x, y, z where x is horizontal, y is vertical, and depth extending away from the camera (or into the image) or generally along the optical axis is z), thereby providing an outer dimension for the 3D space in all three directions. By other forms, the span of the 3D observation points will be inadequate, especially as mentioned in the example above where the points are concentrated around one distance from the camera (or front of the image) by one example. In this case, the dimensions of the calibration volume are preset or verified by measuring a pictured (3D) object of known size and setting the volume relative to the object. The current method (or model) of predicting the quality of a calibration is based on measuring the accuracy of a calibration by using independent measuring of known objects inside or outside the calibration volume. This can be automated, for example, by using calibration targets, like in chart calibration.

Two heuristic measures may be used to estimate the quality of the calibration. A camera calibration may be sufficient if: (A) a 2D distribution of 2D observation points covers the image sufficiently (in the x and y dimensions), and (B) the 3D observation points are sampling the calibration volume sufficiently in the z or depth direction along the optical axis of the camera(s) and projected to extend within an image (or 3D space for an image set). It will be understood that for multiple cameras, the z direction may be relative to one of the multiple cameras, which may be a central camera of the multiple cameras for example, of may be extending along a combined (averaged) optical axis. Criterion (A) is important to estimate image related parameters such as radial distortions. The second criteria (B) relates to the other camera parameters mentioned herein, but both determine the overall quality of the calibration.

Figure 6:
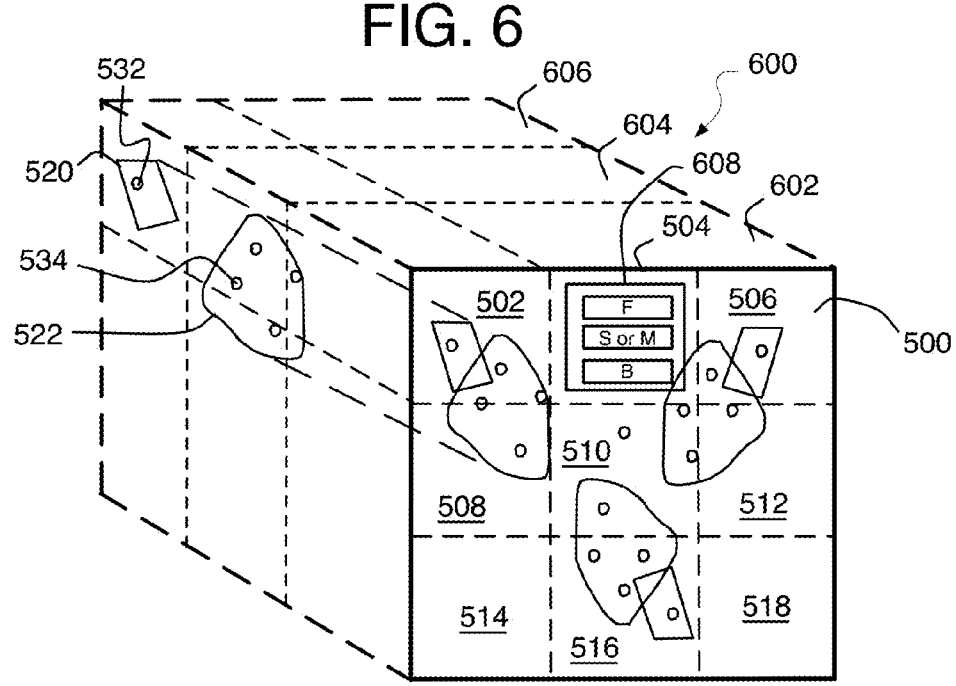
FIG. 6 is an illustrative diagram of a 3D distribution space shown extending from an image and a 2D pattern.

Referring to FIGS. 5 and 6, once the outer dimensions of the 3D space (or calibration volume) is set, process 300 may include "define sections of the 2D pattern and 3D calibration volume" 328. Specifically, one way to determine the quality of the 2D and 3D sampling is to divide the 3D space. In the 2D case (A), an image or 2D space (or 2D pattern) 500, determined by the image size, may be divided into N horizontal×M vertical areas or 2D sections (502 to 518 numbered evenly). A 3×3 division into nine 2D sections is depicted with objects 520 to 530 positioned in the 2D image space, and where the small circles (532 to 542) represent the 2D keypoint projections of the 3D observation points determined from the calibration and that occupy the 3D space. While the sections are shown in a 2D pattern of squares or rectangles of equal area, the spacing of the sections in the 2D pattern can have equal dimensions or may have non-linear sizes to emphasize specific camera features, e.g., such as fish-eye lenses with dense sampling of smaller sections at the outer borders of the image for example. The sections may have areas that vary from the center of the pattern or image to the outer border or across the entire pattern or image by some sequential arrangement of dimensions such as logarithmic or exponential ($x^{-n}$ for one example). By other examples, instead of a 2D pattern with rectangles, the pattern may be a polar graph where the 2D sections are curved around a center point. Many other examples are contemplated.

The number, size, and shape of the 2D sections (N×M) of the 2D pattern may be determined by experimentation. As understood from above, a prediction model is built to predict, from the calibration data (and in particular its 2D/3D distribution), how good (quality) and reliable a calibration is (confidence). The procedure to do that is: a) run the calibration, b) compare the result to a reference, and c) set the parameters of the prediction model. The reference can be determined by chart calibration or independent measure of any other 3d object. The parameters of the prediction model are weights and functions to combine the values described herein: 2d and 3d histograms, including the binning (grid sizes), and functions to combine the histograms to a value. A machine learning system could be used to learn the function to combine the above mentioned information to give the prediction of quality+confidence of the calibration. This can be performed with, for example a multi-layered preceptor neural network. The learning phase of this supervised methods uses samples of the input values (histograms, and so forth) and a target vector. The target is quality+ confidence. These two values can be determined by measuring the distance (such as a Euclidian distance of the camera parameters of the calibration vs. the reference parameters).

Referring to FIG. 6, a 3D or depth pattern 600 representing a 3D space associated with an image or set of images is shown. The 3D space 600 has a front face formed by the 2D pattern 500 and extends back or within the image from the front face. The objects of the 2D pattern 500, such as objects 520 and 522, as well as the 3D observation points 532 and 534, are projected to the proper location within the 3D space. For the depth dimension, the 3D space is divided into 3D or depth sections of layers and arrayed along the optical axes of the camera(s) and that extends through the image or image set being analyzed. The 3D pattern divides the 3D space into three depth sections 602, 604, and 606. By one form, the layer-like depth sections 602 to 604 are used to determine the distribution pattern without further sub-divisions. By other alternatives, each depth section 602 to 606 may be divided into nine sub-sections to align with the nine sections of the 2D pattern 500. It will be understood that the depth sections may be arrayed (or layered) in different directions such as along the x or y directions instead of the z direction from the image as with 3D pattern 600. The number, shape, and size of the 3D depth sections are determined by experimentation, and basically as mentioned for the 2D pattern above. For a database of image sets with a given reference calibration, a grid sampling is determined that is sufficient to provide a prediction model for quality+confidence.

Process 300 then may include "determine distribution of 3D observation points within 2D pattern" 330 and "determine distribution of 3D observation points within depth space" 332. Thus, the process locates the 3D observation points (or more accurately the 2D points projecting the 3D observation points) within the 2D pattern sections, and locates the projected 3D observation points within the depth sections. By one form, sections without any 3D observation point are noted, and by other approaches, how many 3D observation points are in each section are counted. By another form, the 3D observation points may only be counted in certain sections rather than all sections and that are deemed a higher priority for a sufficient distribution. The function that combines the information of the histograms can be trained by a neural network (e.g. multi-layer perceptron), as stated above.

Process 300 then may include "determine quality or confidence value(s) for distributions" 334. By one approach, the distribution is determined simply by counting the 3D observation points in each of the sections and maintaining the count as a measure of the quality. By another example, the process 300 provides each distribution with a single numeric value quantifying the quality of the distribution. The 2D distribution for the 2D pattern can be computed as:

$$Q2D = \text{variance}(\text{count}(k)) \qquad (6)$$

where count (k) is the number of observation points in each section (also referred to as a sub-division area), and where the variance operation is the sum of the differences between the count(k) in each section and the mean count of all sections. The variance will be relatively large when any of the sections are empty. Thus, the criteria (A) for the 2D pattern may be satisfied by comparison of the quality value Q2D with a threshold E2D to determine if the distribution is sufficient and that is determined by experiments as explained herein.

The criteria (B) for the 3D space can be determined in an analog way by setting the depth sections as sub-dividing a calibration volume V=(Dx, Dy, Dz) at distance D from the camera device into L×K×O sub-volumes and determining Q3D:

$$Q3D = \text{variance}(\text{count}(l)) \qquad (7)$$

where the l is the number of 3D observation points in each section, and the variance operation is as described above for the 2D pattern. This quality value Q3D is compared with a threshold E3D determined by experiments and as described below.

By yet another optional approach to quantify the distributions, the calculation of a confidence value is performed, and may include one confidence value for the 2D pattern and one confidence value for the 3D space. The confidence values then may be compared to thresholds as explained below to determine whether the distribution is sufficient. In this example, the evaluation of 2D and 3D distribution of the key points is performed with a histogram analysis. For the 2D pattern for example, a histogram $O_{LM}(l, m)$ e.g. $O_{33}$ represents a 3×3 histogram. $O_{33}(l, m)$ gives the frequency of the histogram bin (l, m) where l is the horizontal section coordinate, and m here is the vertical section coordinate of the 2D pattern and in turn the corresponding histogram and with maximum values (or pattern and histogram size) (L, M).

A set of auxiliary functions may be defined as follows:
Horizontal index:

$$H_p = F_M\left(\sum_i^M O_{LM}(p, i)\right) \qquad (8)$$

Vertical index:

$$V_s = F_M\left(\sum_i^L O_{LM}(i, s)\right) \qquad (9)$$

With the indexing function:

$$F_M(n) = S\left(\frac{n}{N} - \frac{\lambda}{M}\right) \qquad (10)$$

$$S(x) = \begin{cases} 1 & \text{if } x > 0 \\ 0 & \text{otherwise} \end{cases} \qquad (11)$$

Where p is histogram row index, s is histogram column index, n is index (function parameter), N is number of histogram observations, S(x) is the step function. The parameter $\lambda = \{0.1, \ldots, 0.4\}$ indicates the minimal occupancy level for $F_M$. There are many different possible functions that can be used to combine the histogram information into a confidence measure. One example confidence measure is:

$$C_{2D} = \left(\sum_i^L H_i + \sum_j^M V_j\right)\frac{1}{L+M} \qquad (12)$$

where $H_i$ is horizontal index, and $V_j$ is vertical index.

From a 3D histogram $O_{31}$ (with one array of 3 layers or sections as shown by FIG. 6):

$$C_{3D} = \left(\sum_i^L H_i\right)\frac{1}{L} \qquad (13)$$

or an alternative:

$$C_{3D}^p = \left(\prod_i^L H_i\right) \qquad (14)$$

where each of these confidence values relates the spread of the 2D or 3D points within the distributions thereby providing an indication as to whether the calibration was successful with regard to a required accuracy. Specifically, the results of confidence equations (12) to (14) are empirical values and can be used as examples to combine the calibration input data to get quality+confidence estimates. Otherwise, neural networks could be used to learn the function (here the example equations (13) and (14) from a large database of example data and reference calibration. Each of these confidence values can then be compared to a threshold confidence value of a sufficient distribution for like size and configuration of the 2D pattern and 3D calibration volume.

Optionally, when multiple image sets are being provided for a calibration, process 300 may include a check to determine "last image set?" 336. If not, the process loops to obtain the next image set (at operation 302) to provide point counts, quality values, or confidence values for each image set by one example. It will be understood as mentioned above that the multiple image sets may be from a single camera or multiple cameras. When a single camera, each image set may be a set of still images of objects in a scene except from different angles, or may be a video sequence from a single position of a non-moving scene where the camera is moved to different positions to take a video at each position. For multiple cameras, a single image set may be a video sequence from one of the cameras, or the image set could be still photos or simultaneous frames of video sequences from all of the cameras, to name a few examples.

Once the last image set is analyzed when multiple image sets are being used, process 300 then may optionally continue with "generate combined confidence result(s) for multiple image sets" 338. Thus, by this example, the confidence values may be combined in some way. The mean value or some other algorithm may be applied to combine the count, quality, or confidence values for example. Otherwise, this operation also includes narrowing the multiple values to a single value in other ways, by selecting one which is considered the best or most accurate of the values, such as the median value for example, or by selecting the confidence value that has some other property related to either the quality of the image data (such as having certain luminance or color values or treatments thereof), or the content in the image (possibly a count of the number of objects in the image and so forth).

In addition (might be an independent paragraph), the data extracted in histograms can be added from multiple images sets. This makes it possible to determine whether the data of multiple image sets are providing keypoints with the required 2D+3D distribution. It can also be used as a test, by adding the histogram data from a new image set to the multi-image data and testing whether that image set improves the predicted calibration quality+confidence. If not, that image data set might be rejected and/or a new image set is requested. Many more examples exist.

Process 300 then may include a check to determine whether "both 2D and depth distribution satisfy criteria?" 340. For a practical calibration, the distribution should cover multiple distances so that, by one ideal, 3D observation points are present in each defined section of the calibration volume in a sampling of the calibration volume so that many different distances from the camera are occupied by the 3D observation points thereby providing a distribution to adequately fill a 3D calibration volume. This test could also be used to give guidance for chart or factory calibration to determine if the calibration volume was sampled in a meaningful way, such as to achieve good quality.

As mentioned above, the criteria could be as simple as determining whether each of the 2D sections and 3D depth sections have at least one 3D observation point or any other specific number of points, or there may be a threshold for the total number of points in the whole 2D pattern. The simple count thresholds could have many different alternatives such as being based on the closest 'x' sections being occupied other than all sections, and so forth as that may be desirable.

For the quality value alternative that determines a variance, experimentation may be performed on certain sizes of 2D pattern and 3D space, such as that shown, until minimum threshold E2D and E3D in the form of a minimum mean quality value is determined. As mentioned above, the threshold may be set by learning such as by neural networks or other methods. Once the distribution quality value and threshold are obtained, the quality values for each 2D and 3D distribution can be compared to thresholds to determine whether the quality values satisfy the criteria. Again, this is an ad-hoc empirical function, and learned thresholds for individual sections and/or the pattern and calibration volume as a whole may be determined by neural networks or other methods.

Otherwise, for computing the threshold for the 2D and 3D confidence values of index ratios or products for example, the threshold also can be determined by experiments. The experiments are as mentioned above. The thresholds may be obtained as mentioned above.

As with the quality value, once the distribution confidence values and thresholds are obtained, the values can be compared to determine whether the confidence values satisfies the criteria.

If the criteria is satisfied, the process has ended, and the last 3D observation points are considered final, and may be used for 3D vision or A.I. applications for example. If not, process 300 continues with "request or perform change in distribution" 342.

A request for a different distribution may be in a form to indicate the request to a user of the camera(s) or an image processing system that operates the cameras. This indication may be a visual indication on a display whether a graphical, icon, or text message on a display, an audible indication, and/or a tactile indication (such as vibration of a smartphone) as long as it is received and understood by a user.

Referring again to FIG. 5, to provide guidance to a user, the 2D pattern 500 may be shown on a display or preview screen of one of the cameras being used or other device that operates the camera or cameras, or is otherwise interconnected to the camera or cameras. A visible change may be displayed on the 2D pattern and in at least one section of the 2D pattern that should be changed (since by one example it is missing any, or enough, 3D observation points within the section). The change may include changing the luminance or color of the section, making the section move relative to the rest of the image (such as oscillate up and down), placing an icon or geometric shape in the section, and providing a text message in the section. By the illustrated example, a red square 544 is displayed in sections 504, 514, and 518 that do not have any 3D observation points on 2D pattern 500. This can be computed and displayed in real-time, and the user can direct the camera device into a different direction until no red squares are showing which indicates all sectors are occupied with at least one 3D observation point by this example.

In the case of the 2D pattern, the changes or text on the pattern will indicate that the camera or cameras should be moved, side to side for example, or pointed to different objects, or the same objects at a different angle, to capture a changed or different scene, thereby establishing a different distribution.

For indicating that the distribution in the 3D space and depth sections are inadequate and should be changed, a text message may be displayed on one or more of the cameras, or other processing device operating or communicating with the one or more cameras, or on another display, and that indicates the camera(s) should be moved back relative to, or away from, the objects in the current scene being photographed or recorded, or that the camera(s) should be moved forward, or closer to, the objects in the scene, in order to change the distribution of the 3D observation points in the depth sections.

Referring again to FIG. 6, otherwise the indicators for the 3D space may operate similar to that of the 2D pattern. In this case, an indicator 608 may show in the front on the display either alone or within one of the sections in the 2D pattern being displayed. For this example, the indicator may have two boxes, one labeled F to indicate the camera should be moved forward, and one labeled B to indicate the camera should be moved back. The box that is colored, such as red, indicates the camera should be moved in that direction until the distribution is satisfactory as with the 2D pattern. The color then turns off or turns another color such as green.

By a further example, each 2D pattern section (502 to 518) has an indicator 608. A third box in indicator 608 is labeled S, and turns red when the section of the 2D pattern has an inadequate 2D point distribution. This indicates the user should move the camera(s) sideways (or other direction) to a new scene as explained above.

By another example, the display has boxes or other graphics that correspond to each of the number of the 3D depth sections arrayed behind, or more accurately considered to be projected within the image or image 3D space, but that may not be shown on the display. In this case, all the user sees on the display is a single indicator 608 or a single indicator 608 on the 2D pattern 500. The position of the boxes, with one for each depth section, within the indicator 608 may be understood to correspond to the position of the depth sections. Specifically, the top box in the indicator 608 represents the front depth section, the middle box represents the middle depth section, and the bottom box represents the back depth section. Otherwise, the boxes may be labeled F (front), M (Middle), and B (Back) as in the illustrated example. The box that is red requires a change in the number of the 3D observation points in the projected depth section to provide a satisfactory distribution.

By yet another example, each of the 2D sections of the 2D pattern (502 to 518) has an indicator 608 with three graphics or boxes, each box corresponding to one of the 3D depth sections extending back from the 2D pattern 500. As with the example above, the box may turn red or green depending on whether the distribution is adequate. Also, one of the boxes may turn a different color, such as orange or yellow, or there may be a fourth box, to indicate the camera should be moved sideways to a different scene for a different view of the objects or different objects to satisfy the 2D distribution as well as the 3D distribution. Many alternatives are possible.

By another example, the 3D space may be displayed in three dimensions as illustrated here in FIG. 6, and where changes may be made to the particular 3D depth sections (602, 604, 606) that require a change in distribution of the 3D observation points as described above (such as by color, text, graphics, and so forth). Otherwise, graphics or text may be displayed on the same 2D pattern used to indicate the 2D distribution. By one approach, similar to the 2D pattern, a user interface may fulfil criteria (B) by providing a text message requesting that the user to move to a scene that is further away—or closer, or has other specific guidance that improves the sampling of the calibration volume. It is also possible to provide a graphical representation of a 1D histogram with color coded bars. Another way to visualize this, it to use a generic 3D model with, for example, a landscape with foreground objects, and tree as mid-distance objects, and mountains as far-range. The histogram can be used to color-code the areas with enough or too few keypoints. The user would, for example, see a visualization from a birds-eye view of this 3D model.

By yet another alternative, instead of, or in addition to, providing indications of a lack of distribution quality to a user, the cameras and the distribution quality assessment described herein could be part of a system with one or more supports that hold and automatically move one or more cameras in certain positions or orientations at least during the geometric calibration process. In this case, the system or camera may automatically perform a change in distribution. To accomplish this, the quality assessment units described herein may provide a signal indicating whether and how to improve the distribution, and providing the signal to a controller, such as control 808 (FIG. 8) or other camera support control 114 separate from, or part of, the image capture device, for example, that then automatically moves the one or more cameras to different orientations or positions to capture a different image set and to attempt to provide a better distribution of 3D observation points. This can be accomplished by conventional robotic arms, computer controlled holders, or other structures. Many examples in this regard are contemplated as well.

Figure 7:
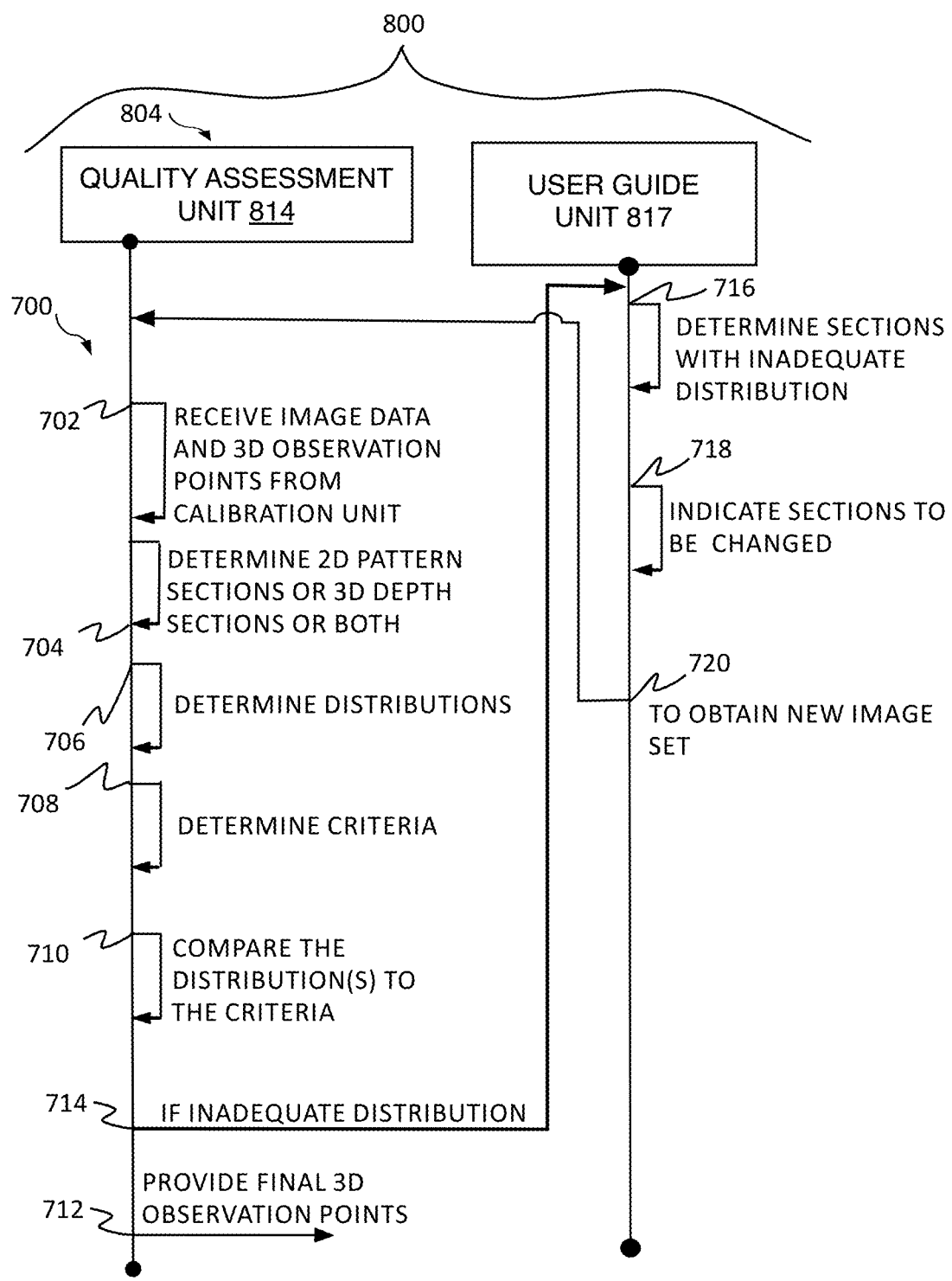
FIG. 7 is an illustrative diagram of an example system in operation for providing a motion estimation process.

Referring to FIG. 7, process 700 illustrates the operation of a sample image processing system 800 that performs lens shading color correction in accordance with at least some implementations of the present disclosure. In more detail, in the illustrated form, process 700 may include one or more operations, functions or actions as illustrated by one or more of actions 702 to 720 numbered evenly. By way of non-limiting example, process 700 will be described herein with reference to FIG. 8. Specifically, system 800 includes logic units 804 that has 3D calibration unit 810 with a feature correspondence unit 812 and a quality assessment unit 814. The latter includes a distribution unit 816 and a criteria unit 818. The 3D calibration unit also may have a user guide unit 817. A calibration computation unit 819 also is provided. The operation of the system may proceed as follows.

Process 700 may include "receive image data and 3D observation point locations from calibration unit" 702, and as explained above, this may include data that has already been at least partially pre-processed, and points that have already been formed, first by detecting 2D points, then triangulation to determine preliminary 3D observation points, and then full calibration computations, such as bundle adjustment by one example to revise the 3D observation point locations.

Process 700 then may include "determine 2D pattern sections or 3D depth sections or both" 704, and particularly to divide the 2D image area into 2D sections to measure an X×Y distribution and the 3D space associated with the image into depth sections each covering a different distance from the camera and into the image along the optical axis or z direction. The sections are established as explained above.

Process 700 may include "determine distributions" 706, and specifically, determine the location of the 3D observation points (and more accurately the 2D projections of those points) on the 2D pattern, and which section of the 2D pattern the points are located. Likewise, this operation includes determining which depth section the points are located. As explained above, this may involve a count for each section, or alternatively determining a quality value based on some overall measurement such as variance, or by computing confidence values that by one example are based on index totals as explained above.

Process 700 may include "determine criteria" 708, and particularly, to establish the threshold values that indicate whether the distribution is satisfactory. The determination of the thresholds is described above, and may be based on the entire distribution or may be applicable to individual sections on the 2D patterns or 3D space or both.

Process 700 may include "compare distribution to the criteria" 710. When the distribution is sufficient, the 3D points may be provided 712 for use by applications. When the distribution is not adequate 714, the operation passes to the user guide unit to indicate to the user that the distribution should be changed in this example.

Process 700 then may include "determine sections with inadequate distribution" 716. In this case, the count of the 3D observation points by section is reviewed, and those with no points (or a low amount of points deemed too low), by one example, may be flagged or otherwise noted for a change in distribution.

Process 700 may include "indicate sections to be changed" 718, and particularly indicate which sections of the 2D pattern, 3D space, or both need to be changed to provide a satisfactory distribution. The indicator will guide the user to move the camera(s) forward, back, or to another scene as explained above. Once the user uses the camera(s) to capture new images, the process then may loop back 720 to the quality assessment unit to obtain and analyze the new image set that incorporates the desired changes. This process may continue until a satisfactory distribution is captured.

In addition, any one or more of the operations of FIGS. 1-6 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions. "Hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 8:
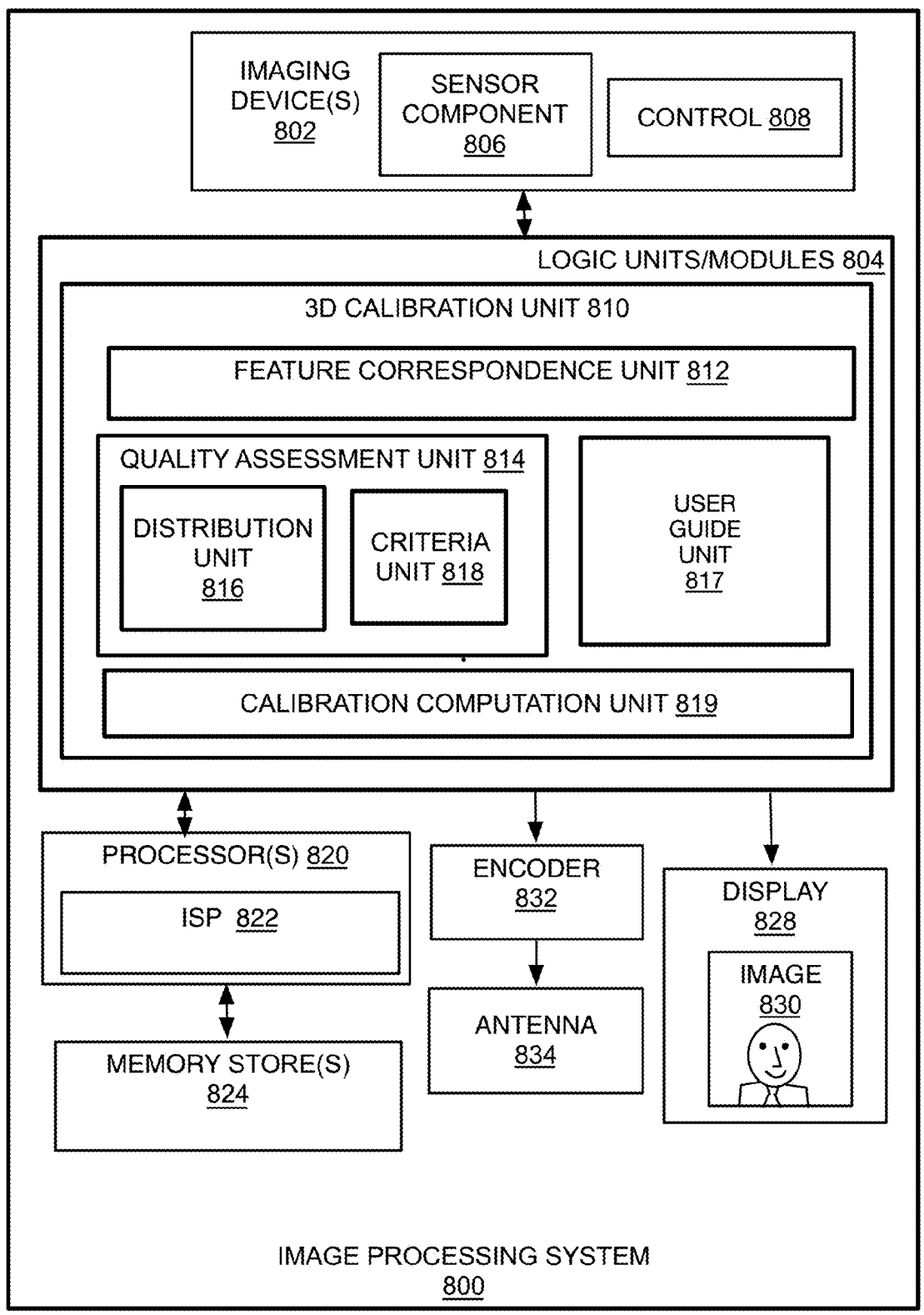
FIG. 8 is an illustrative diagram of an example system.

Referring to FIG. 8, an example image processing system 800 is arranged in accordance with at least some implementations of the present disclosure. In various implementations, the example image processing system 800 may have an imaging device 802 to form or receive captured image data. This can be implemented in various ways. Thus, in one form, the image processing system 800 may be a digital camera or other image capture device, and imaging device 802, in this case, may be the camera hardware and camera sensor software, module, or component. In other examples, imaging processing system 800 may have an imaging device 802 that includes or may be a camera, and logic modules 804 may communicate remotely with, or otherwise may be communicatively coupled to, the imaging device 802 for further processing of the image data. Imaging device 802 may be, or may be part of, a tablet with one or more cameras.

In either case, such technology may include a camera such as a digital camera system, a dedicated camera device, or an imaging phone, whether a still picture or video camera or some combination of both. Thus, in one form, imaging device 802 may include camera hardware and optics including one or more sensors as well as auto-focus, zoom, aperture, ND-filter, auto-exposure, flash, and actuator controls. These controls may be part of a sensor module or component 806 for operating the sensor. The sensor component 806 may be part of the imaging device 802, or may be part of the logical modules 804 or both. Such sensor component can be used to generate images for a viewfinder and take still pictures or video. The imaging device 802 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 802 may be provided with an eye tracking camera. The imaging device 802 also may have a lens actuator or control 808 that has a lens and a lens driver or driver logic that receives commands to move the lens and applies an electrical current to move the lens.

In the illustrated example, the logic modules 804 may include a 3D calibration unit 810 that has a feature correspondence unit 812 to provide preliminary 3D observation point locations, a calibration computation unit 819 that performs the full calibration, such as with bundle arrangement computations and camera parameter setting, a quality assessment unit 814 which may have a distribution unit 816 to establish the distributions and a criteria unit 818 to set the comparison thresholds and to perform the comparisons to determine the sufficiency of the distributions, and in turn the calibrations. A user guide unit 817 is provided to indicate a request for a change in the distribution to a user. The 3D calibration unit 810 may be operated by, or even entirely or partially located at, processor(s) 820, and which may include an ISP 822 to perform the operations. The logic modules may be communicatively coupled to the components of the imaging device 802 in order to receive raw image data. In these cases, it is assumed the logic modules 804 are considered to be separate from the imaging device. This need not be so, and the logic modules very well may be considered to be part of the imaging device as well.

The image processing system 800 may have one or more processors 820 which may include a dedicated image signal processor (ISP) 822 such as the Intel Atom, memory stores 824 which may or may not hold 3D calibration data, one or more displays 828 to provide images 830, encoder 832 that has an inter-prediction unit 836 to provide motion data such as motion vectors for example, and antenna 834. In one example implementation, the image processing system 800 may have the display 828, at least one processor 820 communicatively coupled to the display, at least one memory 824 communicatively coupled to the processor to perform the operations described herein as explained above. The encoder 832 and antenna 834 may be provided to compress the modified image date for transmission to other devices that may display or store the image as well as provide motion data. It will be understood that the image processing system 800 may also include a decoder (or encoder 832 may include a decoder) to receive and decode image data for processing by the system 800. Otherwise, the processed image 830 may be displayed on display 828 or stored in memory 824. As illustrated, any of these components may be capable of communication with one another and/or communication with portions of logic modules 804 and/or imaging device 802. Thus, processors 820 may be communicatively coupled to both the image device 802 and the logic modules 804 for operating those components. By one approach, although image processing system 800, as shown in FIG. 8, may include one particular set of blocks or actions associated with particular components or modules, these blocks or actions may be associated with different components or modules than the particular component or module illustrated here.

Figure 9:
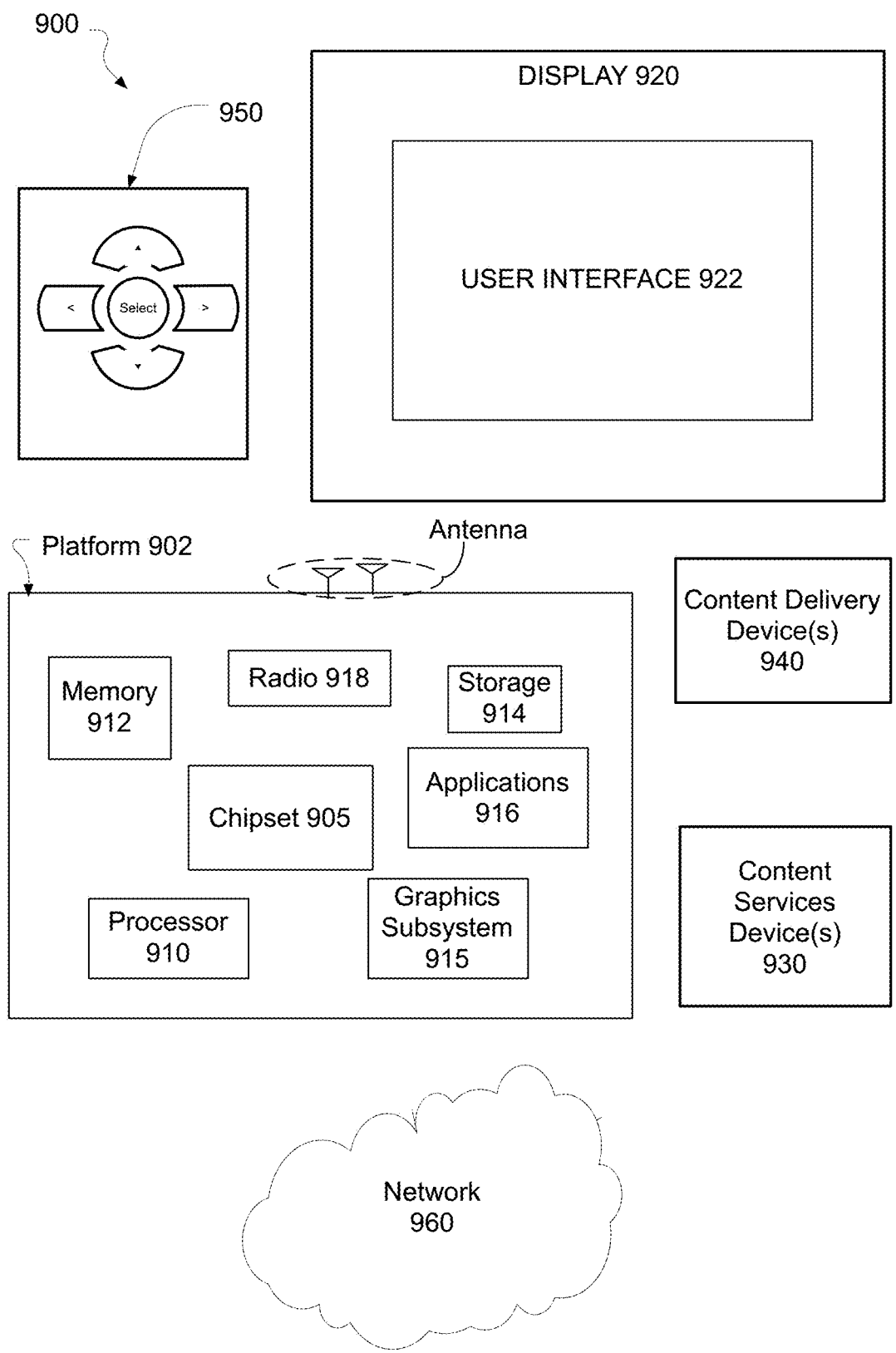
FIG. 9 is an illustrative diagram of another example system.

Referring to FIG. 9, an example system 900 in accordance with the present disclosure operates one or more aspects of the image processing system described herein. It will be understood from the nature of the system components described below that such components may be associated with, or used to operate, certain part or parts of the image processing system described above. In various implementations, system 900 may be a media system although system 900 is not limited to this context. For example, system 900 may be incorporated into one, or a network of, digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, Display Port, wireless HDMI, and/or wireless HD compliant techniques. Graphics subsystem 915 may be integrated into processor 910 or chipset 905. In some implementations, graphics subsystem 915 may be a stand-alone card communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television, and including a camera preview screen. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of controller 950 may be used to interact with user interface 922, for example. In implementations, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In implementations, controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various implementations, platform 902 and display 920 may be an integrated unit. Display 920 and content service device(s) 930 may be integrated, or display 920 and content delivery device(s) 940 may be integrated, for example. These examples are not meant to limit the present disclosure.

In various implementations, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 9.

Figure 10:
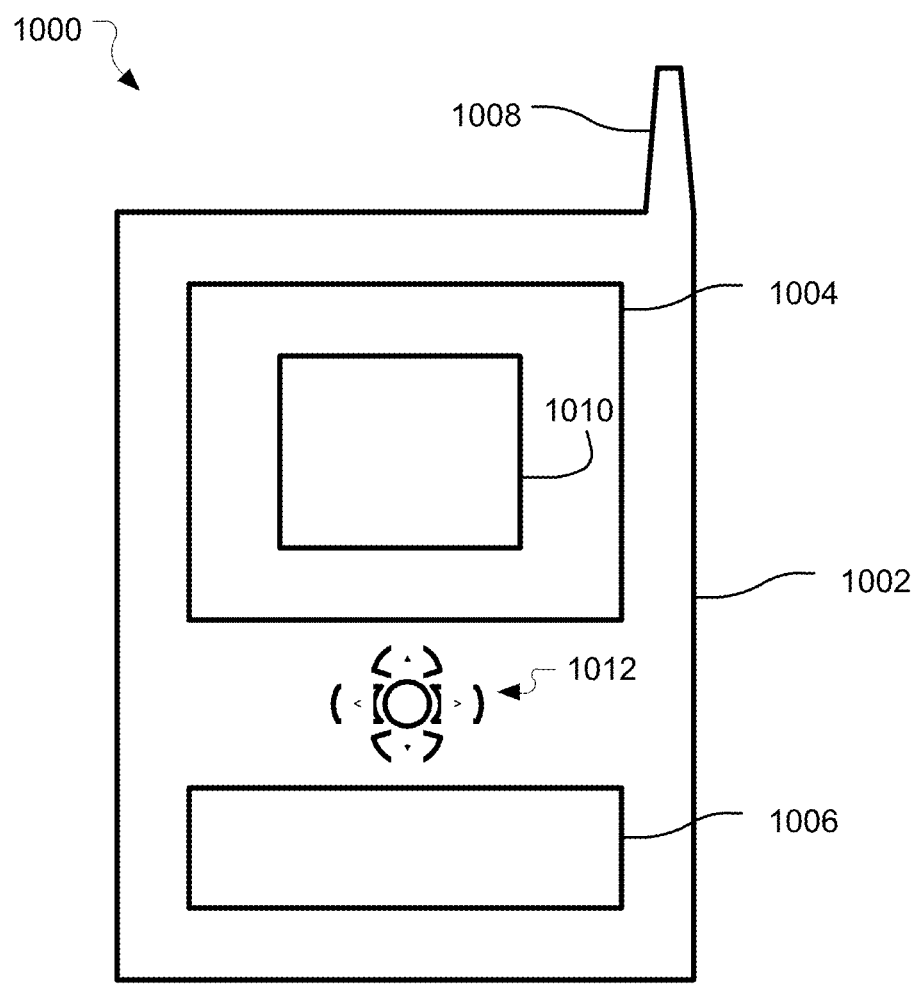
FIG. 10 illustrates another example device, all arranged in accordance with at least some implementations of the present disclosure.

Referring to FIG. 10, a small form factor device 1000 is one example of the varying physical styles or form factors in which system 900 may be embodied. By this approach, device 1000 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet with one or more cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 10, device 1000 may include a housing 1002, a display 1004 including a screen 1010, an input/output (I/O) device 1006, and an antenna 1008. Device 1000 also may include navigation features 1012. Display 1004 may include any suitable display unit for displaying information appropriate for a mobile computing device. I/O device 1006 may include any suitable I/O device for entering information into a mobile computing device. Examples for I/O device 1006 may include an alphanumeric keyboard, a numeric keypad, a touch pad, input keys, buttons, switches, rocker switches, microphones, speakers, voice recognition device and software, and so forth. Information also may be entered into device 1000 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores", may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of camera self-calibration comprises obtaining image data comprising 3D observation point locations associated with at least one image and indicating the location of at least one object in the content of the at least one image. The method also comprises determining whether the 3D observation point locations have a sufficient distribution within a space associated with the at least one image by determining whether the distribution meets a criteria.

By another implementation, the method may comprise setting 3D observation point locations from 2D points on a plurality of the images using triangulation; and performing an initial calibration to adjust the locations of the 3D observation points to use the adjusted 3D observation point locations to determine the sufficiency of the distribution; wherein performing a calibration comprises performing bundle adjustment (BA) to determine the adjusted 3D observation point locations; and wherein determining whether the 3D observation point locations have a sufficient distribution comprises generating a 2D pattern having 2D sections and at least one of: a grid with rectangular sections, a grid with rectangular sections where the sections are not all the same size, a grid with rectangular sections that have dimensions that vary exponentially, a grid with sections with decreasing or increasing dimensions as the sections are disposed farther away from a center of the grid, and a polar chart where the sections are curved around a center point.

By yet other implementations, the method comprises wherein determining whether the 3D observation point locations have a sufficient distribution comprises at least one of: computing a quality value for the distribution that factors a variance of the number of 3D observation points in each section from a mean, and comparing the quality value to a threshold, computing a confidence value for the distribution that determines a ratio that factors a horizontal or vertical index or both of the number of 3D observation points in a row or column, or both of the sections in the 2D pattern, and compares the confidence value to a threshold, computing a confidence value for the distribution that factors the product of the horizontal or vertical indices or both of the number of 3D observation points in a row, column, or both of sections in the 2D pattern, and compares the confidence value to a threshold, and detecting whether at least a minimum number of the 3D observation point locations are located within one or more or all 2D sections; wherein determining whether the 3D observation point locations have a sufficient distribution comprises generating a 3D space with depth sections arrayed along a projection of an optical axis of the image.

Further, the method may include wherein determining whether the 3D observation point locations have a sufficient distribution comprises at least one of: computing a quality value for the distribution that factors a variance of the number of 3D observation points in each depth section from a mean, and comparing the quality value to a threshold, computing a confidence value for the distribution that determines a ratio that factors the number of 3D observation points in each depth section and the total number of sections, and compares the confidence value to a threshold, computing a confidence value for the distribution that factors the product of the number of 3D observation points in each depth section, and compares the confidence value to a threshold, and detecting whether at least a minimum number of the 3D observation point locations are located within one or more or all of the depth sections; wherein generating the 3D space comprises forming the depth sections as at least one of: arrayed sections each with the same thickness in the direction of the optical axis, arrayed sections at least two of which have a different thickness in the direction of the optical axis, and arrayed sections with increasing or decreasing thicknesses in the direction of the optical axis as the sections are disposed farther away from a front of the image.

The method may be comprising indicating at least one camera forming the at least one image should be moved to capture a different image to obtain a better distribution; wherein the indicating comprises at least one of: a visual indication on a display, a text message on a display, an audible indication, and a tactile indication; The method comprising: displaying a visible change in at least one section of a pattern divided into sections and on a display of at least one of the images, and providing a visible change to at least one of the sections to indicate the changed section should include one or more 3D observation points for a better 3D observation point distribution; changing the sections of the pattern differently depending on whether the at least one camera should be moved: (1) side to side either relative to the objects in the image or to change the objects in the image, or (2) closer or farther relative to the objects in the image, or (3) both (1) and (2); changing the section by at least one of: changing the luminance or color of at least one section, making at least one section move relative to the rest of the image, placing an icon or geometric shape in at least one section, and providing a text message in at least one section; wherein the 3D observation points used to assess the distribution are computed by using multiple images taken from one camera taken over time or taken from multiple cameras substantially at the same time. The method comprising: receiving image data of a second set of images of different content after it is determined that the distribution is insufficient; performing a re-calibration of initial 3D observation point locations of the second set of images to form a set of adjusted 3D observation point locations; and determining the sufficiency of the distribution of the set of adjusted 3D observation points.

By other approaches, the operations provided by the method may similarly be provided by a system, and particularly, a computer-implemented system that has a display, at least one processor communicatively coupled to the display, at least one memory communicatively coupled to at least one processor and storing image capture data of at least one frame of a video sequence or at least one still photograph, and at least one quality assessment unit communicatively coupled to the processor and to perform many or all of the operations provided by the method and except those operations from the method performed by a user guide unit.

By one other approach, the features provided by the method and/or system may be provided by at least one computer readable medium that comprises a plurality of instructions that in response to being executed on a computing device, causes the computing device to perform some or all of the operations that are performed by the method.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of camera self-calibration comprising:
    obtaining, on an image capture device, image data comprising 3D observation point locations associated with at least one image and indicating the location of at least one object in the content of the at least one image;
    calibrating the image capture device comprising forming a calibration space;
    determining, on the image capture device, whether the 3D observation point locations have a sufficient distribution within the calibration space associated with the at least one image by determining whether the distribution meets a criterion, wherein the distribution is the distribution of the number of 3D observation point locations within a certain area of a scene provided in the at least one image; the determining comprising:
dividing the calibration space into geometric sections after the calibration,
counting the 3D observation point locations in each of the sections, and
using the counts to form values to compare to thresholds;
indicating, on the image capture device, the image capture device should be moved to capture subsequent images to repeat the calibration upon determining the distribution is inadequate; and
re-calibrating the image capture device using the subsequent images.

2. The method of claim 1 comprising setting 3D observation point locations from 2D points on a plurality of the images using triangulation.

3. The method of claim 1 wherein the calibrating comprising adjusting the locations of the 3D observation points to use the adjusted 3D observation point locations to determine the sufficiency of the distribution.

4. The method of claim 3 wherein the calibrating comprises performing bundle adjustment (BA) to determine the adjusted 3D observation point locations.

5. The method of claim 1 wherein determining whether the 3D observation point locations have a sufficient distribution comprises generating a 2D pattern having 2D sections and at least one of:
a grid with rectangular sections,
a grid with rectangular sections where the sections are not all the same size,
a grid with rectangular sections that have dimensions that vary exponentially,
a grid with sections with decreasing or increasing dimensions as the sections are disposed farther away from a center of the grid, and
a polar chart where the sections are curved around a center point.

6. The method of claim 5 wherein determining whether the 3D observation point locations have a sufficient distribution comprises at least one of:
computing a quality value for the distribution that factors a variance of the number of 3D observation points in each section from a mean, and comparing the quality value to a threshold,
computing a confidence value for the distribution that determines a ratio that factors a horizontal or vertical index or both of the number of 3D observation points in a row or column, or both of the sections in the 2D pattern, and compares the confidence value to a threshold,
computing a confidence value for the distribution that factors the product of the horizontal or vertical indices or both of the number of 3D observation points in a row, column, or both of sections in the 2D pattern, and compares the confidence value to a threshold, and
detecting whether at least a minimum number of the 3D observation point locations are located within one or more or all 2D sections.

7. The method of claim 1 wherein determining whether the 3D observation point locations have a sufficient distribution comprises generating a 3D space with depth sections arrayed along a projection of an optical axis of the image.

8. The method of claim 7 wherein determining whether the 3D observation point locations have a sufficient distribution comprises at least one of:
computing a quality value for the distribution that factors a variance of the number of 3D observation points in each depth section from a mean, and comparing the quality value to a threshold,
computing a confidence value for the distribution that determines a ratio that factors the number of 3D observation points in each depth section and the total number of sections, and compares the confidence value to a threshold,
computing a confidence value for the distribution that factors the product of the number of 3D observation points in each depth section, and compares the confidence value to a threshold, and
detecting whether at least a minimum number of the 3D observation point locations are located within one or more or all of the depth sections.

9. The method of claim 7 wherein generating the 3D space comprises forming the depth sections as at least one of:
arrayed sections each with the same thickness in the direction of the optical axis,
arrayed sections at least two of which have a different thickness in the direction of the optical axis, and
arrayed sections with increasing or decreasing thicknesses in the direction of the optical axis as the sections are disposed farther away from a front of the image.

10. The method of claim 1 comprising indicating to a user of the image capture device forming the at least one image should be moved to capture a different image to obtain a better distribution.

11. The method of claim 10 wherein the indicating comprises at least one of:
a visual indication on a display,
a text message on a display,
an audible indication, and
a tactile indication.

12. The method of claim 10 comprising:
displaying a visible change in at least one section of a pattern divided into sections and on a display of at least one of the images that indicates the image capture device should be moved to capture the subsequent images and indicated to a user of the image capture device, and
providing a visible change to at least one of the sections to indicate, to the user of the image capture device, that the image capture device should be moved to capture subsequent images because the changed section should include one or more 3D observation points for a better 3D observation point distribution.

13. The method of claim 12 comprising changing the sections of the pattern differently depending on whether the image capture device should be moved:
(1) side to side either relative to the objects in the image or to change the objects in the image, or
(2) closer or farther relative to the objects in the image, or
(3) both (1) and (2).

14. The method of claim 12 comprising changing the section by at least one of:
changing the luminance or color of at least one section,
making at least one section move relative to the rest of the image,
placing an icon or geometric shape in at least one section, and
providing a text message in at least one section.

15. The method of claim 1 wherein the 3D observation points used to assess the distribution are computed by using multiple images taken from one camera taken over time or taken from multiple cameras substantially at the same time.

16. The method of claim 1 comprising receiving image data of a second set of images of different content after it is determined that the distribution is insufficient.

17. The method of claim 16 comprising performing a re-calibration of initial 3D observation point locations of the second set of images to form a set of adjusted 3D observation point locations; and determining the sufficiency of the distribution of the set of adjusted 3D observation points.

18. The method of claim 1 comprising:
setting 3D observation point locations from 2D points on a plurality of the images using triangulation; and
wherein the calibrating comprising adjusting the locations of the 3D observation points to use the adjusted 3D observation point locations to determine the sufficiency of the distribution;
wherein the calibrating comprises performing bundle adjustment (BA) to determine the adjusted 3D observation point locations;
wherein determining whether the 3D observation point locations have a sufficient distribution comprises generating a 2D pattern having 2D sections and at least one of:
a grid with rectangular sections,
a grid with rectangular sections where the sections are not all the same size,
a grid with rectangular sections that have dimensions that vary exponentially,
a grid with sections with decreasing or increasing dimensions as the sections are disposed farther away from a center of the grid, and
a polar chart where the sections are curved around a center point;
wherein determining whether the 3D observation point locations have a sufficient distribution comprises at least one of:
computing a quality value for the distribution that factors a variance of the number of 3D observation points in each section from a mean, and comparing the quality value to a threshold,
computing a confidence value for the distribution that determines a ratio that factors a horizontal or vertical index or both of the number of 3D observation points in a row or column, or both of the sections in the 2D pattern, and compares the confidence value to a threshold,
computing a confidence value for the distribution that factors the product of the horizontal or vertical indices or both of the number of 3D observation points in a row, column, or both of sections in the 2D pattern, and compares the confidence value to a threshold, and
detecting whether at least a minimum number of the 3D observation point locations are located within one or more or all 2D sections;
wherein determining whether the 3D observation point locations have a sufficient distribution comprises generating a 3D space with depth sections arrayed along a projection of an optical axis of the image;
wherein determining whether the 3D observation point locations have a sufficient distribution comprises at least one of:
computing a quality value for the distribution that factors a variance of the number of 3D observation points in each depth section from a mean, and comparing the quality value to a threshold,
computing a confidence value for the distribution that determines a ratio that factors the number of 3D observation points in each depth section and the total number of sections, and compares the confidence value to a threshold,
computing a confidence value for the distribution that factors the product of the number of 3D observation points in each depth section, and compares the confidence value to a threshold, and
detecting whether at least a minimum number of the 3D observation point locations are located within one or more or all of the depth sections;
wherein generating the 3D space comprises forming the depth sections as at least one of:
arrayed sections each with the same thickness in the direction of the optical axis,
arrayed sections at least two of which have a different thickness in the direction of the optical axis, and
arrayed sections with increasing or decreasing thicknesses in the direction of the optical axis as the sections are disposed farther away from a front of the image;
the method comprising:
indicating the image capture device forming the at least one image to a user of the image capture device should be moved to capture a different image to obtain a better distribution, wherein the indicating comprises at least one of:
a visual indication on a display,
a text message on a display,
an audible indication, and
a tactile indication;
displaying a visible change in at least one section of a pattern divided into sections and on a display of at least one of the images that indicates the image capture device should be moved to capture the subsequent images and indicated to a user of the image capture device,
providing a visible change to at least one of the sections to indicate, to the user of the image capture device, that the image capture device should be moved to capture subsequent images because the changed section should include one or more 3D observation points for a better 3D observation point distribution;
changing the sections of the pattern differently depending on whether the image capture device should be moved:
(1) side to side either relative to the objects in the image or to change the objects in the image, or
(2) closer or farther relative to the objects in the image, or
(3) both (1) and (2);
changing the section by at least one of:
changing the luminance or color of at least one section,
making at least one section move relative to the rest of the image,
placing an icon or geometric shape in at least one section, and
providing a text message in at least one section;
wherein the 3D observation points used to assess the distribution are computed by using multiple images taken from one camera taken over time or taken from multiple cameras substantially at the same time;
the method comprising:
receiving image data of a second set of images of different content after it is determined that the distribution is insufficient;

performing a re-calibration of initial 3D observation point locations of the second set of images to form a set of adjusted 3D observation point locations; and determining the sufficiency of the distribution of the set of adjusted 3D observation points.

19. A computer-implemented system comprising:
at least one display;
at least one memory;
at least one processor communicatively coupled to at least one of the memories and displays; and
at least one image processing device having a quality assessment unit to:
obtain, on an image capture device, image data comprising 3D observation point locations associated with at least one image and indicating the location of at least one object in the content of the at least one image;
a calibration unit to calibrate the image capture device comprising forming a calibration space;
the quality assessment unit to determine, on the image capture device, whether the 3D observation point locations have a sufficient distribution within the calibration space associated with the at least one image by determining whether the distribution meets a criterion, wherein the distribution is the distribution of the number of 3D observation point locations within a certain area of a scene provided in the at least one image; the determining comprising:
dividing the calibration space into geometric sections after the calibration,
counting the 3D observation point locations in each of the sections, and
using the counts to form values to compare to thresholds;
a user guide unit to indicate, on the image capture device, the image capture device should be moved to capture subsequent images to repeat the calibration upon determining the distribution is inadequate; and
the calibration unit to re-calibrate the image capture device using the subsequent images.

20. The system of claim 19 wherein determining whether the 3D observation point locations have a sufficient distribution comprises generating a 2D pattern having 2D sections and generating a depth pattern with depth sections arrayed along a projection associated with at least one optical axis of the image.

21. The system of claim 20 wherein determining whether the 3D observation point locations have a sufficient distribution comprises detecting whether at least a minimum number of the 3D observation point locations are located within one or more or all 2D sections.

22. The system of claim 20 comprising detecting whether at least a minimum number of the 3D observation point locations are located within one or more or all of the depth sections.

23. The system of claim 19 wherein the quality assessment unit is to:
set 3D observation point locations from 2D points on a plurality of the images using triangulation; and
wherein to calibrate comprises to adjust the locations of the 3D observation points to use the adjusted 3D observation point locations to determine the sufficiency of the distribution;
wherein to calibrate comprises performing bundle adjustment (BA) to determine the adjusted 3D observation point locations;

wherein determining whether the 3D observation point locations have a sufficient distribution comprises generating a 2D pattern having 2D sections and at least one of:
a grid with rectangular sections,
a grid with rectangular sections where the sections are not all the same size,
a grid with rectangular sections that have dimensions that vary exponentially,
a grid with sections with decreasing or increasing dimensions as the sections are disposed farther away from a center of the grid, and
a polar chart where the sections are curved around a center point;
wherein determining whether the 3D observation point locations have a sufficient distribution comprises at least one of:
computing a quality value for the distribution that factors a variance of the number of 3D observation points in each section from a mean, and comparing the quality value to a threshold,
computing a confidence value for the distribution that determines a ratio that factors a horizontal or vertical index or both of the number of 3D observation points in a row or column, or both of the sections in the 2D pattern, and compares the confidence value to a threshold,
computing a confidence value for the distribution that factors the product of the horizontal or vertical indices or both of the number of 3D observation points in a row, column, or both of sections in the 2D pattern, and compares the confidence value to a threshold, and
detecting whether at least a minimum number of the 3D observation point locations are located within one or more or all 2D sections;
wherein determining whether the 3D observation point locations have a sufficient distribution comprises generating a 3D space with depth sections arrayed along a projection of an optical axis of the image;
wherein determining whether the 3D observation point locations have a sufficient distribution comprises at least one of:
computing a quality value for the distribution that factors a variance of the number of 3D observation points in each depth section from a mean, and comparing the quality value to a threshold,
computing a confidence value for the distribution that determines a ratio that factors the number of 3D observation points in each depth section and the total number of sections, and compares the confidence value to a threshold,
computing a confidence value for the distribution that factors the product of the number of 3D observation points in each depth section, and compares the confidence value to a threshold, and
detecting whether at least a minimum number of the 3D observation point locations are located within one or more or all of the depth sections;
wherein generating the 3D space comprises forming the depth sections as at least one of:
arrayed sections each with the same thickness in the direction of the optical axis,
arrayed sections at least two of which have a different thickness in the direction of the optical axis, and
arrayed sections with increasing or decreasing thicknesses in the direction of the optical axis as the sections are disposed farther away from a front of the image;

the system having a user guide unit to indicate to a user of the image capture device forming the at least one image should be moved to capture a different image to obtain a better distribution,
wherein the indicating comprises at least one of:
a visual indication on a display,
a text message on a display,
an audible indication, and
a tactile indication;
the user guide unit to:
display a visible change in at least one section of a pattern divided into sections and on a display of at least one of the images that indicates the image capture device should be moved to capture the subsequent images and indicated to a user of the image capture device, and
provide a visible change to at least one of the sections to indicate, to the user of the image capture device, that the image capture device should be moved to capture subsequent images because the changed section should include one or more 3D observation points for a better 3D observation point distribution;
the user guide unit to change the sections of the pattern differently depending on whether the image capture device should be moved:
(1) side to side either relative to the objects in the image or to change the objects in the image, or
(2) closer or farther relative to the objects in the image, or
(3) both (1) and (2);
the user guide unit to change the section by at least one of:
changing the luminance or color of at least one section,
making at least one section move relative to the rest of the image,
placing an icon or geometric shape in at least one section, and
providing a text message in at least one section;
wherein the 3D observation points used to assess the distribution are computed by using multiple images taken from one camera taken over time or taken from multiple cameras substantially at the same time;
the system to:
receive image data of a second set of images of different content after it is determined that the distribution is insufficient;
perform a re-calibration of initial 3D observation point locations of the second set of images to form a set of adjusted 3D observation point locations; and
determine the sufficiency of the distribution of the set of adjusted 3D observation points.

24. A non-transitory computer-readable medium having stored thereon instructions that when executed cause a computing device to:
obtain, on an image capture device, image data comprising 3D observation point locations associated with at least one image and indicating the location of at least one object in the content of the at least one image;
calibrate the image capture device comprising forming a calibration space;
determine, on the image capture device, whether the 3D observation point locations have a sufficient distribution within the calibration space associated with the at least one image by determining whether the distribution meets a criterion, wherein the distribution is the distribution of the number of 3D observation point locations within a certain area of a scene provided in the at least one image; the determining comprising:
dividing the calibration space into geometric sections after the calibration,
counting the 3D observation point locations in each of the sections, and
using the counts to form values to compare to thresholds;
indicate, on the image capture device, the image capture device should be moved to capture subsequent images to repeat the calibration upon determining the distribution is inadequate; and
re-calibrate the image capture device using the subsequent images,
obtain image data comprising 3D observation point locations associated with at least one image and indicating the location of at least one object in the content of the at least one image; and
determine whether the 3D observation point locations have a sufficient distribution within a space associated with the at least one image by determining whether the distribution meets a criterion, wherein the distribution is a distribution of the number of 3D observation point locations within a certain area of a scene provided in the at least one image.

25. The computer-readable medium of claim 24 wherein the computing device is to:
set 3D observation point locations from 2D points on a plurality of the images using triangulation; and
wherein to calibrate comprises to adjust the locations of the 3D observation points to use the adjusted 3D observation point locations to determine the sufficiency of the distribution;
wherein to calibrate comprises performing bundle adjustment (BA) to determine the adjusted 3D observation point locations;
wherein determining whether the 3D observation point locations have a sufficient distribution comprises generating a 2D pattern having 2D sections and at least one of:
a grid with rectangular sections,
a grid with rectangular sections where the sections are not all the same size,
a grid with rectangular sections that have dimensions that vary exponentially,
a grid with sections with decreasing or increasing dimensions as the sections are disposed farther away from a center of the grid, and
a polar chart where the sections are curved around a center point;
wherein determining whether the 3D observation point locations have a sufficient distribution comprises at least one of:
computing a quality value for the distribution that factors a variance of the number of 3D observation points in each section from a mean, and comparing the quality value to a threshold,
computing a confidence value for the distribution that determines a ratio that factors a horizontal or vertical index or both of the number of 3D observation points in a row or column, or both of the sections in the 2D pattern, and compares the confidence value to a threshold,
computing a confidence value for the distribution that factors the product of the horizontal or vertical indices or both of the number of 3D observation points in a row, column, or both of sections in the 2D pattern, and compares the confidence value to a threshold, and
detecting whether at least a minimum number of the 3D observation point locations are located within one or more or all 2D sections;

wherein determining whether the 3D observation point locations have a sufficient distribution comprises generating a 3D space with depth sections arrayed along a projection of an optical axis of the image;

wherein determining whether the 3D observation point locations have a sufficient distribution comprises at least one of:
- computing a quality value for the distribution that factors a variance of the number of 3D observation points in each depth section from a mean, and comparing the quality value to a threshold,
- computing a confidence value for the distribution that determines a ratio that factors the number of 3D observation points in each depth section and the total number of sections, and compares the confidence value to a threshold,
- computing a confidence value for the distribution that factors the product of the number of 3D observation points in each depth section, and compares the confidence value to a threshold, and
- detecting whether at least a minimum number of the 3D observation point locations are located within one or more or all of the depth sections;

wherein generating the 3D space comprises forming the depth sections as at least one of:
- arrayed sections each with the same thickness in the direction of the optical axis,
- arrayed sections at least two of which have a different thickness in the direction of the optical axis, and
- arrayed sections with increasing or decreasing thicknesses in the direction of the optical axis as the sections are disposed farther away from a front of the image;

wherein the indicating comprises at least one of:
- a visual indication on a display,
- a text message on a display,
- an audible indication, and
- a tactile indication;

the computing device is to:
- display a visible change in at least one section of a pattern divided into sections and on a display of at least one of the images that indicates the image capture device should be moved to capture the subsequent images and indicated to a user of the image capture device, and
- provide a visible change to at least one of the sections to indicate, to the user of the image capture device, that the image capture device should be moved to capture subsequent images because the changed section should include one or more 3D observation points for a better 3D observation point distribution;

the computing device is to change the sections of the pattern differently depending on whether the image capture device should be moved:
(1) side to side either relative to the objects in the image or to change the objects in the image, or
(2) closer or farther relative to the objects in the image, or
(3) both (1) and (2);

the user guide unit to change the section by at least one of:
- changing the luminance or color of at least one section,
- making at least one section move relative to the rest of the image,
- placing an icon or geometric shape in at least one section, and
- providing a text message in at least one section;

wherein the 3D observation points used to assess the distribution are computed by using multiple images taken from one camera taken over time or taken from multiple cameras substantially at the same time;

the computing device is to:
- receive image data of a second set of images of different content after it is determined that the distribution is insufficient;
- perform a re-calibration of initial 3D observation point locations of the second set of images to form a set of adjusted 3D observation point locations; and
- determine the sufficiency of the distribution of the set of adjusted 3D observation points.

* * * * *